(12) United States Patent
Hasani et al.

(10) Patent No.: US 10,587,521 B2
(45) Date of Patent: Mar. 10, 2020

(54) HIERARCHICAL ORCHESTRATION OF A COMPUTER NETWORK

(71) Applicant: Facebook, Inc., Menlo Park, CA (US)

(72) Inventors: Naader Hasani, San Jose, CA (US); Hans-Juergen Schmidtke, Mountain View, CA (US); Najam Ahmad, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 115 days.

(21) Appl. No.: 15/805,858

(22) Filed: Nov. 7, 2017

(65) Prior Publication Data

US 2019/0140958 A1    May 9, 2019

(51) Int. Cl.
| | | |
|---|---|---|
| *H04L 12/815* | (2013.01) |
| *H04L 12/825* | (2013.01) |
| *H04L 12/813* | (2013.01) |
| *H04L 12/801* | (2013.01) |
| *H04L 12/851* | (2013.01) |
| *H04L 12/803* | (2013.01) |
| *H04L 12/24* | (2006.01) |
| *H04L 12/26* | (2006.01) |

(52) U.S. Cl.
CPC ............ *H04L 47/22* (2013.01); *H04L 41/044* (2013.01); *H04L 41/0893* (2013.01); *H04L 41/12* (2013.01); *H04L 43/0888* (2013.01); *H04L 43/16* (2013.01); *H04L 47/125* (2013.01); *H04L 47/20* (2013.01); *H04L 47/24* (2013.01); *H04L 47/25* (2013.01); *H04L 47/29* (2013.01)

(58) Field of Classification Search
None
See application file for complete search history.

(56) References Cited

U.S. PATENT DOCUMENTS

| | | | | |
|---|---|---|---|---|
| 2007/0006186 | A1* | 1/2007 | Johnson | .................. G06F 8/458 717/140 |
| 2007/0209070 | A1* | 9/2007 | Yadav | ................. H04L 63/1408 726/14 |
| 2012/0226733 | A1* | 9/2012 | Kim | ........................ H04L 67/00 709/201 |
| 2014/0112139 | A1* | 4/2014 | Allan | .................... H04L 47/125 370/235 |
| 2017/0085486 | A1* | 3/2017 | Chung | ................ H04L 41/0893 |
| 2019/0052532 | A1* | 2/2019 | Chen | ................... H04L 41/0896 |

\* cited by examiner

*Primary Examiner* — Robert M Morlan
(74) *Attorney, Agent, or Firm* — Van Pelt, Yi & James LLP

(57) ABSTRACT

The disclosure is directed to a system for hierarchically orchestrating network traffic including a network orchestration module and multiple device orchestration modules. The device orchestration module is configured to receive network traffic. The device orchestration module may transmit device data to the network orchestration module. The network orchestration module is configured to perform a network level orchestration to coordinate network traffic across multiple device orchestration modules based on the device data received by the device orchestration modules. The device orchestration module comprises a routing layer configured to forward network traffic to downstream computing devices. The device orchestration module includes a compute node configured to perform a device level orchestration of the network traffic between the routing nodes of the device orchestration module.

20 Claims, 7 Drawing Sheets

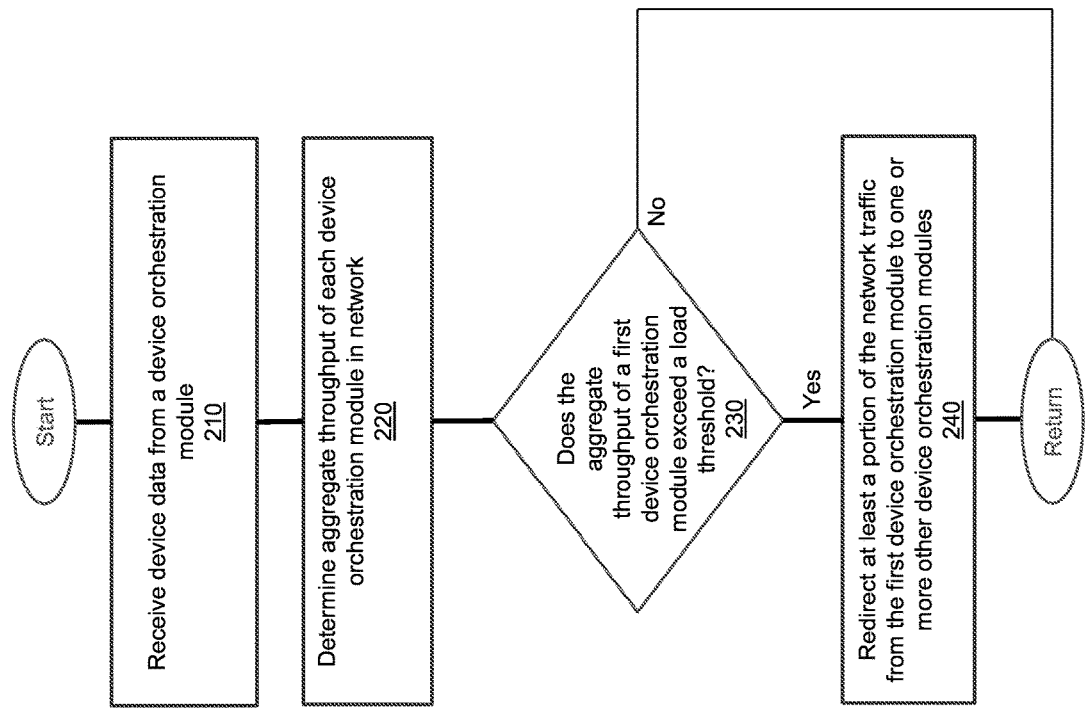

HIERARCHICAL ORCHESTRATION OF A COMPUTER NETWORK

BACKGROUND

Many entities, such as corporations, governmental agencies, and educational institutions, maintain computer networks to interconnect entity devices. Many networks have faced an increasing demand for network data, and in response, many networks have grown in size and scale to handle the increasing demand. Some conventional networks may utilize one or more networking devices as the core of the network, where the core networking devices are generally responsible with forwarding the majority of the network traffic as well as providing additional functionality to the network. Some core network devices may include additional functionality, such as orchestration capabilities, i.e., the ability to provision a network device to manage other network devices.

However, utilizing a conventional core networking device to implement a significant amount of network orchestrating functionalities may present certain issues. One such issue is that a conventional core networking device may require a large amount of resources to properly configure and maintain the core networking device. This can create a bottleneck in the performance of the network and increase the delay in responding to data access requests from users. Additionally, identifying issues within the network may be difficult, as many functions are simultaneously implemented within the core network device.

A conventional network utilizing a core networking device can be inefficient when scaling and growing the size of the network. In some conventional networks, the core networking device may need to be provisioned and reconfigured to forward network traffic and orchestrate the new network devices added in response to increased network demand. However, provisioning the core networking device may be laborious, and erroneously provisioning the core networking device places the network integrity of the network as a whole at risk.

BRIEF DESCRIPTION OF THE DRAWINGS

FIG. 2 is a flow diagram of a process of performing a network level orchestration, consistent with various embodiments.

DETAILED DESCRIPTION

Figure 1A:
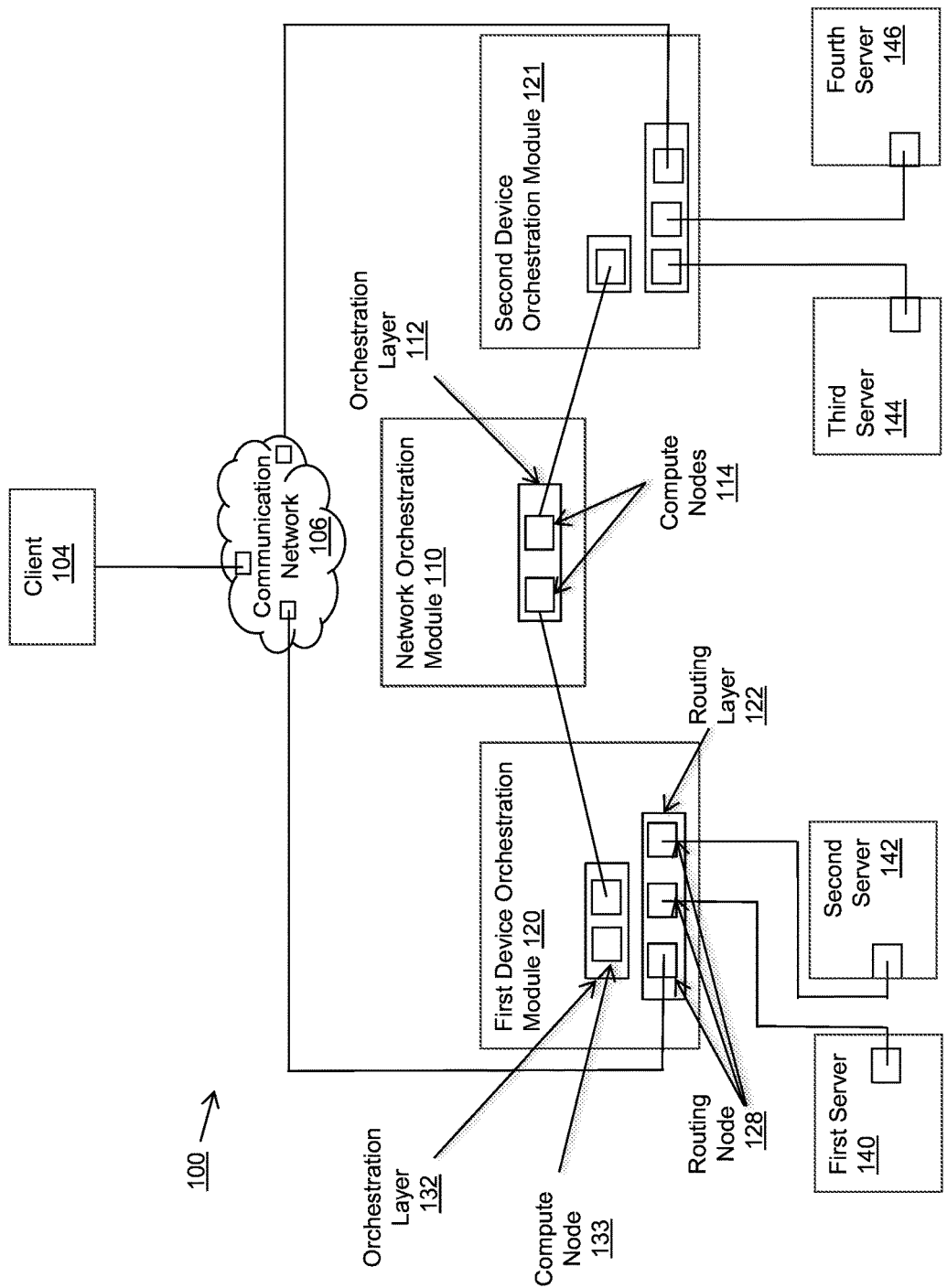
FIG. 1A is an environment in which hierarchical network orchestration can be implemented, consistent with various embodiments.

Embodiments are disclosed for a system to hierarchically orchestrate network traffic. Network traffic, such as data access requests in a social networking platform, are received by multiple device orchestration modules in a computer network and are forwarded to one or more downstream computing devices, such as a server computing device ("server") that processes social network data. The device orchestration module can perform a device-level orchestration, e.g., orchestrating network traffic within the device orchestration module. The computer network includes a network orchestration module that can perform network level orchestration, e.g., orchestrating network traffic between the device orchestration modules.

The device orchestration modules may include a routing layer having multiple routing nodes that receive the network traffic and forward it to the appropriate downstream computing device and/or transmits the network traffic from a server to an entity that issued the data access request, e.g., a client computing device ("client"). The device orchestration module may include an orchestration layer having one or more compute nodes configured to perform a device-level orchestration. The device-level orchestration can include orchestrating or coordinating network traffic within the device orchestration module, e.g., between the routing nodes of the device orchestration module. Network orchestration or orchestration of network traffic can include performing various network-related functions, e.g., load balancing between network entities based on a traffic load on the corresponding entity, detecting and resolving network anomalies such as a distributed denial of service (DDoS) attack, traffic engineering, etc.

One example of the device-level orchestration includes load balancing of network traffic within the device orchestration module. As mentioned above, the device orchestration module forwards network traffic from and/or to the servers using the routing nodes. Some routing nodes may be handling more network traffic load, e.g., a number of data access requests and/or responses to the requests, than the others. The device orchestration module performs device-level orchestration by load balancing the network traffic between the routing nodes within the device orchestration module. In some embodiments, the device orchestration module may determine a throughput of each routing node, e.g., an amount of data forwarding requests handled by the routing node, within the device orchestration module. If the device orchestration module determines that the throughput of the network traffic of a specified routing node exceeds a specified threshold, the device orchestration module may redirect the network traffic from the specified routing node to one or more other routing nodes within the device orchestration module, e.g., to a routing node whose throughput is less than the specified threshold. By performing the device-level orchestration, the device orchestration module may balance network traffic loads between each routing node within the device orchestration module.

The network orchestration module orchestrates the network traffic across multiple device orchestration modules. The device orchestration modules may transmit device data, which includes information regarding (a) the network traffic at a corresponding device orchestration module, and/or (b) one or more attributes of the corresponding device orchestration module, to the network orchestration module. The network orchestration module may analyze the device data and perform a network-level orchestration to orchestrate network traffic between the multiple device orchestration devices. Examples of network-level orchestration can include performing load balancing of network traffic across device orchestration modules, identifying and resolving DDoS attack on one or more servers, etc.

In performing the load balancing across device orchestration modules, the network orchestration module may analyze the device data received from the device orchestration modules and determine an aggregate throughput of each of the device orchestration modules. The network orchestration module may determine whether network traffic should be redirected from one or more device orchestration modules based on the network traffic load of the device orchestration modules. For example, if the network orchestration module determines that the network traffic load at a specified device orchestration module exceeds a specified threshold, the network orchestration module may redirect at least some of the network traffic from the specified device orchestration module to one or more other device orchestration modules to balance the aggregate network traffic load between the device orchestration modules. The one or more other device orchestration modules may be those device orchestration modules at which the traffic load is either less than the specified threshold or less than that of the specified device orchestration module. The network orchestration module can set the specified load threshold in various ways. For example, the load threshold can be set per device orchestration module, which can be different for different device orchestration modules depending on their hardware and/or software configurations. In another example, the load threshold can be set per device orchestration module as a percentage of the entire network traffic in the computer network, such as 20% of the entire network traffic.

In another example of network-level orchestration, the network orchestration module may analyze the device data from the device orchestration modules to determine an aggregate of a number of data access requests received for a specified server across the device orchestration modules. The network orchestration module may determine whether the amount of data access requests for the specified server exceeds a specified threshold. If the aggregate number of requests is above the threshold, the network orchestration module may determine that there is a possibility of DDoS attack on the specified server. The network orchestration module may instruct the device orchestration modules to apply a policy, e.g., inspect data packets representing the network traffic to the specified server before sending them to the server. By taking such an action, the network orchestration module can prevent malicious data packets from entering the computer network from any of the device orchestration modules.

To summarize, a device orchestration module may receive and forward network traffic from one entity to another, and perform a device-level orchestration of the network traffic, e.g., between multiple routing nodes within the device orchestration module to forward the network traffic to multiple servers. A network orchestration module may receive device data from the device orchestration module, and perform a network-level orchestration by orchestrating network traffic between multiple device orchestration modules.

Having hierarchical orchestration in a computer network may allow for decentralization of the computer network, e.g., a reduced reliance on one particular device to perform a majority of network orchestration, and therefore, a better throughput in responding to data access requests from users. Providing multiple device level orchestration modules to perform networking functions may allow for a scalable network design, where additional device level orchestration modules may be added to meet growing network demand. A decentralized network may allow for easier troubleshooting, as multiple layers of orchestration may allow an issue to be detected to one device level orchestrator, for example. Engaging multiple device level orchestration modules to perform specific tasks may allow for more robust performance of many network applications to create a more dynamic and efficient network.

FIG. 1A is an environment 100 in which hierarchical network orchestration can be implemented, consistent with various embodiments. Network traffic may comprise data packets representing ingress data and/or egress data. In some embodiments, network traffic corresponding to ingress data may originate at a client device 104, e.g., a data access request for social network data. The ingress data may be destined for downstream computing devices managed, e.g., servers 140-146. In some embodiments, network traffic corresponding to egress data may originate from the servers 140-146, e.g., a response to the data access requests received from a client device. The client device 104 may comprise a computing device capable of accessing social network data, such as a personal computer, a laptop, a tablet, a smartphone, a server, a networking device, or another device known in the art.

For example, the client device 104 may issue a request to access data from one or more of the servers. The data access request transmitted by the client device 104 may have the destination Internet protocol (IP) address of a server, e.g., a first server 140, to which the data access request is to be transmitted. The client device 104 may be associated with a device-specific MAC address, as well as an IP address. In some embodiments, a computer network over which the servers 140-146, a first device orchestration module 120, a second device orchestration module 121, and network orchestration module 110 communicate with each other is referred to as a local network. The client device 104 may transmit the data access request over the communication network 106, e.g., Internet. The data access request may be ingress traffic, e.g., data originating outside the local network and transmitted to a device within the local network.

The environment 100 may include multiple device orchestration modules, e.g., a first device orchestration module 120 and a second device orchestration module 121. The first device orchestration module 120 may receive network traffic from client devices, e.g., the client device 104, and over the communication network 106. The first device orchestration module 120 may be configured to conduct network functions, such as packet forwarding (of data packets corresponding to data access requests from client devices and/or data packets corresponding to the response to the data access requests). A routing layer 122 includes multiple routing nodes, e.g., a first routing node 128 and a second routing node 129, that facilitate packet forwarding. The routing layer 122 communicatively connects the first device orchestration module 120 to multiple downstream computing devices, e.g., a first server 140 and a second server 142.

The first device orchestration module 120 also includes an orchestration layer 132 having one or more compute nodes 133, which facilitate in performing a device-level orchestration, e.g., orchestrate network traffic within the first device orchestration module 120. The first device orchestration module 120 will be discussed in greater detail in FIG. 1B.

The servers 140-146 may be configured to receive network traffic from any of the device orchestration modules. A first server 140 may be configured to store and process social networking data. The first server 140 may be configured to perform one or more network functions. One such function may comprise, for example, a web server, which can respond to a request from the client device 104 for viewing a web page. The servers 140-146 may originate egress traffic destined for the client device 104. The servers 140-146 may store and process requests for specific data types, such as, for example, text, video, or audio data stored on the servers 140-146.

The environment 100 includes a network orchestration module 110. The network orchestration module 110 performs network-level orchestration, e.g., orchestrate network traffic across the device orchestration modules, such as a first device orchestration module 120 and a second device orchestration module 121. The network orchestration module 110 receives device data from the device orchestration modules that is representative of a variety of network data, e.g., (a) the network traffic at a corresponding device orchestration module, and/or (b) one or more attributes of the corresponding device orchestration module. The network orchestration module 110 has an orchestration layer 112, which includes one or more compute nodes 114 that analyzes the device data and performs network-level orchestration, e.g., orchestrate network traffic across the device orchestration modules.

The device orchestration modules and the network orchestration module 110 may be located in a point of POP of the local network. The POP may be an artificial demarcation point or interface point between distinct communicating entities, e.g., interface between the local network having servers that manage social network data of users and an external network, e.g., Internet 106. Any incoming network traffic, e.g., a data access request from the client device 104, is received at one of the device orchestration modules in the POP and forwarded to the corresponding server to respond to the data access request. The network orchestration module 110 may also be disposed at the POP of the local network. The POP may include a module that performs network address translations (NAT) to translate public IP addresses to private IP addresses for the local network. The POP may include security modules that are configured to prevent malicious data from entering the network, such as a firewall, for example.

Figure 1B:
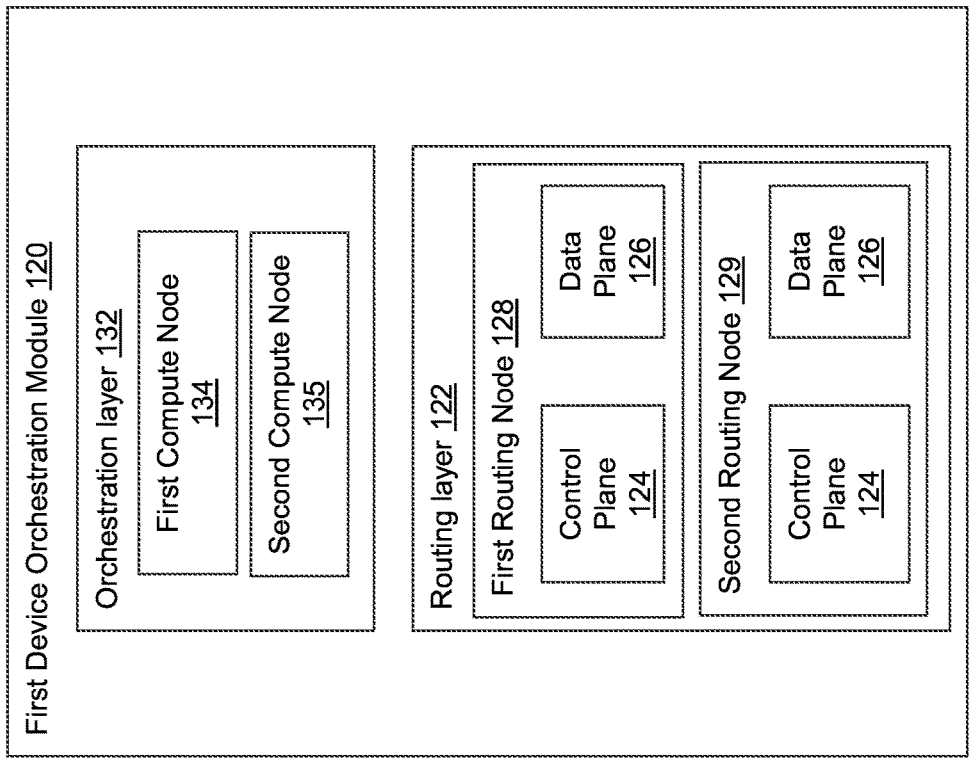
FIG. 1B is a block diagram of a device orchestration module of FIG. 1, consistent with various embodiments.

FIG. 1B is a block diagram of a device orchestration module of FIG. 1, consistent with various embodiments. As described above, the first device orchestration module 120 may be configured to forward network traffic and perform orchestration functions within the first device orchestration module 120. The first device orchestration module 120 includes a routing layer 122, which facilitates in packet forwarding. The routing layer 122 is a logical grouping of the multiple routing nodes, e.g., a first routing node 128 and a second routing node 129. The first routing node 128 includes a control plane 124 that is configured to control the forwarding of network traffic. In some embodiments, the control plane 124 is the part of a network that carries signaling traffic and is responsible for making decisions about where traffic is sent, e.g., determining a route to forward the data packets to the destination. Control packets originate from or are destined for a router. The functions of the control plane 124 include network configuration, management, and exchange of routing table information between multiple routing nodes, etc. Control plane packets are processed by the routing node to update the routing table information.

The first routing node 128 includes a data plane 126 that is configured to forward the network traffic, e.g., user data such as data access requests, response to data access requests. In some embodiments, the data plane 126 forwards the network traffic to the next hop along the path to the destination, e.g., to one of the servers 140-146 according to control plane logic. The data plane packets go through the routing node. Each routing node can forward network traffic to one of the servers 140-146.

In some embodiments, the first routing node 128 is referred to as a line card. The first routing node 128 may include a processor to complete the routing functions. The processor may be an application-specific integrated circuit (ASIC). The ASIC processor may be reprogrammable to perform other network functionality in addition to packet forwarding. The first routing node 128 may utilize a known OSI layer 2 or layer 3 switching or routing protocol to redirect network traffic. The routing layer 122 may utilize virtual routing and forwarding, an internet protocol (IP) processes allowing for a device to utilize multiple instances of a routing table on a device simultaneously to route network traffic. Each routing node may be given a virtual address utilizing a protocol such as virtual local area network (VLAN).

The orchestration layer 132 includes one or more compute nodes, e.g., a first compute node 134 and a second compute node 135, to execute the network functionality, e.g., device-level orchestration. The compute nodes may process and execute instructions to orchestrate network traffic between the routing nodes, for example. Each of the compute nodes can determine and store one or more parameters ("device-level orchestration parameters") regarding the network traffic handled by the device orchestration module that can be used to perform the device-level orchestration. For example, the first compute node 134 can determine the throughput of each routing node. In another example, the first compute node 134 can determine whether there is a potential DDoS attack on a specified server based on the number of data access requests received across all the routing nodes for the specified server. In still another example, the first compute node 134 can perform traffic engineering functions for the network traffic handled by the first device orchestration module 120, such as steering egress traffic to/away from a specified set of egress links (communication path from a server to another entity) by prefix injection or other techniques. In some embodiments, egress traffic engineering allows the first compute node 134 to instruct a routing node handling ingress traffic to direct the traffic towards a specific egress routing node and a specific external interface to reach a particular destination out of the local network. The egress traffic engineering can allow for the selection of the best advertised egress route and mapping of the selected best route to a specific egress point. In case of load balancing at the ingress, this feature ensures optimum utilization of the advertised egress routes.

Based on the device-level orchestration parameters, the compute nodes may perform device-level orchestration activities, e.g., determine whether to redirect network traffic from one routing node to one or more other routing nodes, whether there is a potential DDoS attack on a specified server, etc. The compute nodes may redirect network traffic to another routing node to balance the network traffic load among the routing nodes. The compute nodes may communicate with the control plane to redirect the network packets from one routing node to another routing node. In some embodiments, the compute nodes may not be able to redirect network traffic from a first device orchestration module 120 to a second device orchestration module 121.

FIG. 2 is a flow diagram of a process 200 of performing a network level orchestration, consistent with various embodiments. In some embodiments, the process 200 may be implemented in the environment 100 of FIG. 1A. A network level orchestration may be performed using the network orchestration module 110. One example of network level orchestration may include balancing network traffic loads between multiple device orchestration modules.

At step 210, the network orchestration module 110 may receive device data from at least two device orchestration modules 120 and 121. The device data may include information regarding (a) the network traffic at a corresponding device orchestration module, and/or (b) one or more attributes of the corresponding device orchestration module. For example, the device data of a device orchestration module may include performance data such as, throughput of the device orchestration module, latency experienced in packet forwarding by the device orchestration module, and bandwidth available in the device orchestration module. In another example, the device data may include status data, such as device status of the device orchestration module or the servers 140-146 relating to whether the device, specific ports, or certain functionality within a device is experiencing issues or errors.

The network orchestration module 110 may utilize IP addresses of each of the device orchestration modules and/or the routing nodes of the device orchestration module to communicate with them. The network orchestration module 110 may also store a map of which of the servers 140-146 is configured to store and process requests for certain data types. The network orchestration module 110 may also determine a load threshold of each device orchestration module to properly balance network traffic across the device orchestration modules. For example, the load threshold can be set per device orchestration module, which can be different for different device orchestration modules depending on their hardware and/or software configurations. In another example, the load threshold can be set per device orchestration module as a percentage of the entire network traffic in the computer network, such as 20% of the entire network traffic. Balancing traffic by performing a network level orchestration may maintain low latency across the device orchestration modules.

At step 220, the network orchestration module 110 may determine the aggregate throughput of each of the device orchestration modules based on the device data received from the device orchestration modules. Aggregate throughput may include the overall network traffic, both ingress and egress network traffic, being forwarded at each of the device orchestration modules. In some embodiments, the network orchestration module 110 may determine aggregate throughput of each of the device orchestration modules based on data type. For example, the first device orchestration module 120 may have a predetermined maximum throughput for a specific data type, such as video data.

At determination step 230, the network orchestration module 110 may determine whether the aggregate throughput of a first device orchestration module 120 exceeds the load threshold set for the first device orchestration module 120. The load threshold, e.g., as described above, may be a predetermined load threshold or a dynamically determined threshold and can be stored at a memory device within the network orchestration module 110. The network orchestration module 110 may determine the load threshold of a specific device orchestration module based on aggregate throughput of each of the device orchestration modules, overall network traffic in the network, and a maximum throughput of the specific device orchestration module.

At step 240, the network orchestration module 110 may redirect at least a portion of the network traffic from the first device orchestration module 120 to one or more device orchestration modules, e.g., whose aggregate throughput will be less than their corresponding load thresholds even after redirection of the traffic. After redirecting at least a portion of the network traffic to one or more other devices, the aggregate throughput of the first device orchestration module 120 will be less than the load threshold.

In accordance with some embodiments, the network orchestration module 110 may determine the data type of the network traffic, and conduct a network level orchestration between the device orchestration modules based on the data type. For example, if it is determined that the aggregate throughput of the first device orchestration module 120 exceeds the load threshold (determination step 230) and the network orchestration module 110 determines that the network traffic originally destined for the first device orchestration module 120 was video data, the network orchestration module 110 may redirect the video data to a second device orchestration module 121. Furthering the above example, the network orchestration module 110 may determine what data types can be supported at each of the device orchestration modules and how much throughput is available for a specific data type, and redirect network traffic to the second device orchestration module 121 that can store and process the video data. The network orchestration module 110 may use a known routing protocol or NAT protocol to route and redirect network traffic from one device orchestration module to another.

Referring back to determination step 230, if the aggregate throughput of the first device orchestration module 120 does not exceed the load threshold (step 240), the process returns or proceeds to a next device orchestration module.

In some embodiments, by conducting a network-level orchestration of redirecting network traffic between the device orchestration modules and not between the routing nodes of the device orchestration modules, which are much more in number than the device orchestration modules, the process may allow for fewer computational resources in the network orchestration module 110, e.g., compared to a single central network orchestrator that orchestrates network traffic between the various device orchestration modules and between the routing nodes within the device orchestration modules. Rather than doing load balancing entirely by a single central orchestrator, the environment 100 balances the network load using multiple levels of orchestration—network level and device level. A decentralized network may allow for a scalable network, where new devices, e.g., device orchestration modules, or compute nodes within a device orchestration module, may be added to the local network to account for increased data demands with fewer resources required to provision the existing network to accommodate for the new network devices. Troubleshooting issues may be easier to detect, as with a decentralized network, issues can be traced to a single device orchestration module rather than analyzing data within the single central orchestrator to find an issue.

Figure 3:
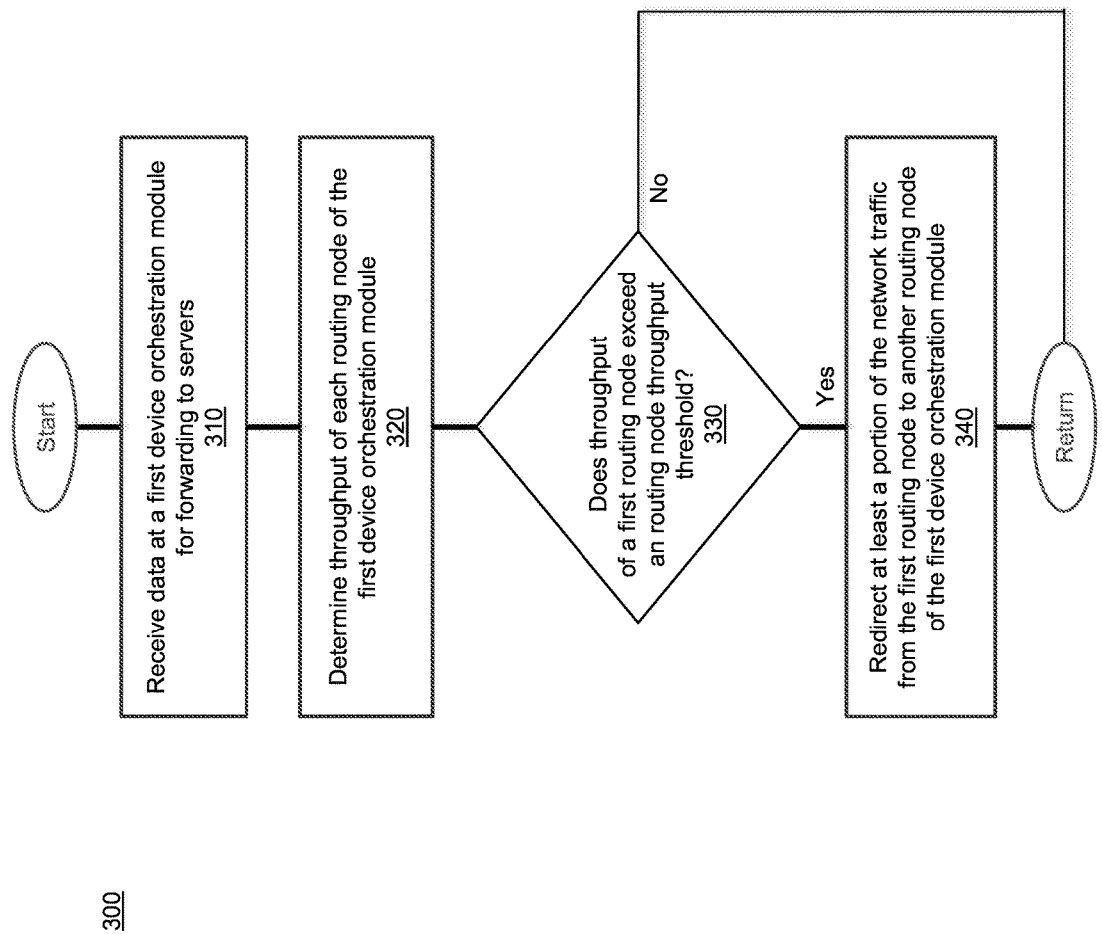
FIG. 3 is a flow diagram of a process of performing a device-level orchestration, consistent with various embodiments.

FIG. 3 is a flow diagram of a process 300 of performing a device-level orchestration, consistent with various embodiments. In some embodiments, the process 300 may be implemented in the environment 100 of FIG. 1. One example of the device-level orchestration includes load balancing across routing nodes of a device orchestration module, e.g., the first device orchestration module 120. The first device orchestration module 120 may be configured to redirect data between the routing nodes of the first device orchestration module 120. The first device orchestration module 120 may perform device-level orchestration, e.g., conduct load balancing within the first device orchestration module 120, while the network orchestration module 110 may perform network-level orchestration, e.g., conduct load balancing between multiple device orchestration modules.

At step 310, the first device orchestration module 120 receives network traffic for forwarding to one or more of the servers 140-146. The network traffic may originate from a client device 104 over the communication network 106. The network traffic may be received by a first routing node 128 of the first device orchestration module 120. Each routing node of the first device orchestration module 120 may include one or more device ports using which data can be received at the first device orchestration module 120 and/or forwarded to the servers 140-146. Each routing node may be associated with an individual IP address or a VLAN address. The first compute node 134 may determine and store which of the servers 140-146 are in communication with the routing nodes. The first device orchestration module 120 may also store information regarding the data types processed by the servers 140-146, e.g., in the first compute node 134 and/or the second compute node 135.

At step 320, the first compute node 134 determines device-level orchestration parameters, e.g., the throughput of each routing node, of the first device orchestration module 120. The throughput of a first routing node 128 can be indicative of an amount of data transferred between the first routing node 128 and the servers 140-142. Other performance measurements may also be determined, such as latency of a routing node, for example. The first device orchestration module 120 may determine how many bits of data are forwarded to each routing node of the first device orchestration module 120 in each second, for example, to determine the throughput of each routing node. The first device orchestration module 120 may sampllete the throughput of each routing node at predetermined time intervals.

At determination step 330, the first compute node 134 may determine whether a first routing node 128 has a throughput greater than a routing node throughput threshold. The routing node throughput threshold may be predetermined at the first device orchestration module 120. The first device orchestration module 120 may determine the routing node throughput threshold based on an aggregate of throughput of all the routing nodes and maximum capabilities of each routing node of the first device orchestration module 120. If the first compute node 134 determines that the first routing node 128 has a throughput less than the routing node throughput threshold, the first compute node 134 may not redirect the network traffic from the first routing node 128, and the process 300 returns or proceeds to checking the throughput of the next routing node.

If the first compute node 134 determines that the throughput of the first routing node 128 has exceeded the routing node throughput threshold, the first compute node 134 redirects at least a portion of the network traffic from the first routing node 128 to one or more other routing nodes whose throughput is less than routing throughput threshold. By redirecting at least a portion of the network traffic from the first routing node 128 to one or more other routing nodes in the first device orchestration module 120, the network traffic is balanced within the first device orchestration module 120. The first device orchestration module 120 may utilize a known NAT protocol or switching protocol, for example, to reconfigure the network traffic to be redirected to another routing node within the first device orchestration module 120.

In some embodiments, the first device orchestration module 120 may redirect data from the first routing node 128 exceeding the routing node throughput threshold to a second routing node 129 based on the data type of the network traffic. For example, if the first routing node 128 is configured to process web page data, the first compute node 134 may redirect data from the first routing node 128 to the second routing node 129 that is configured to process web page data.

Figure 4:
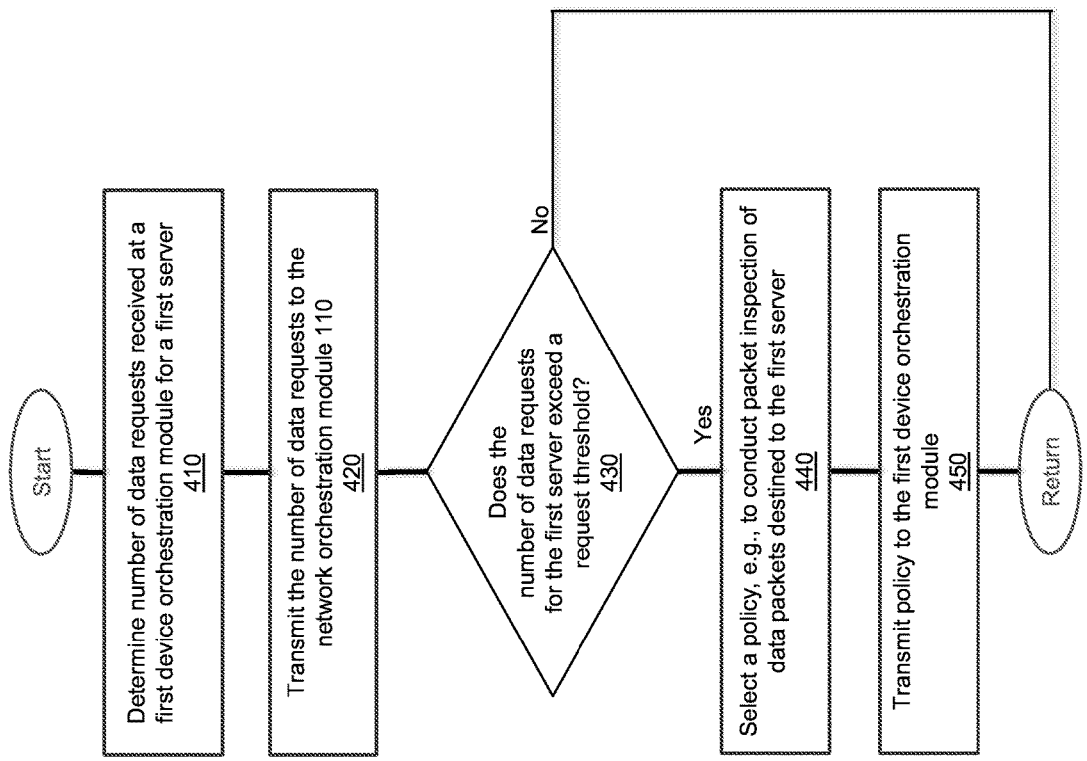
FIG. 4 is a flow diagram of a process to identify and mitigate a potential distributed denial of service (DDoS) attack, consistent with various embodiments.

FIG. 4 is a flow diagram of a process 400 to identify and mitigate a potential DDoS attack, consistent with various embodiments. In some embodiments, the process 400 may be implemented in the environment 100 of FIG. 1. The network orchestration module 110 may set a policy to prevent the transmission of malicious requests, e.g., that is found to be a DDoS attack, to the servers 140-146. Preventing malicious addresses from transmitting future network traffic into the local network may mitigate damage done by an attack such as a DDoS attack, or another malicious attempt to compromise network devices. Utilizing network orchestration to prevent DDoS attacks may be advantageous, as the orchestration devices may mitigate DDoS attacks faster and with fewer resources than manual intervention and manually reconfiguring a conventional single central orchestration device to prevent the DDOS attack. Additionally, the first device orchestration module 120 may dynamically detect a large volume of requests for web data resembling a malicious attack to deny service to legitimate web data users. The network orchestration module 110 and the first device orchestration module 120 together may utilize fewer computational resources to detect and set policies to inspect data packets to prevent and mitigate damage from a malicious attack to the network.

At step 410, the first compute node 134 of the first device orchestration module 120 determines a number of data access requests received at the first device orchestration module 120 for a first server 140. The first compute node 134 can track the number of data access requests for the first server 140 based on the destination IP address in the data access requests. Each of the servers 140-146 has a unique IP address. Each ingress data packet may indicate the IP address of a server. The first compute node 134 can dynamically track the aggregate number of data requests for each of the servers 140-146. The first compute node 134 may also track the latency of each of the servers 140-146 to determine if the corresponding server is processing the data requests at an acceptable rate.

At step 420, the first device orchestration module 120 transmits device data, which includes information regarding a number of data requests received at the first device orchestration module 120 for the first server 140, to the network orchestration module 110. The network orchestration module 110 may receive device data from each of the multiple device orchestration modules. The network orchestration module 110 may aggregate the number of requests for data across the device orchestration modules.

At determination step 430, the network orchestration module 110 (e.g., a compute node of the network orchestration module) determines whether the number of data access requests for the first server 140 exceeds a request threshold.

In some embodiments, the first server 140 receiving data access requests above a request threshold may be under a malicious attack, such as a DDoS attack. The request threshold may be a predetermined threshold determined by the network orchestration module 110 or by another entity, e.g., a network administrator. The request threshold may be dynamically determined by analyzing the number of requests across the network, and determining whether a specific server is receiving data requests at a greater rate than others in the network.

If the network orchestration module 110 determines that the number of data access requests for the first server 140 does not exceed the request threshold, the process 400 returns. On the other hand, if the network orchestration module 110 determines that the number of data access requests for the first server 140 exceeds the request threshold, at step 440, the network orchestration module 110 may determine that the first server 140 is under a potential DDoS attack. The network orchestration module 110 may select a policy to conduct packet inspection of data packets representing data access requests destined to the first server 140. Enacting a packet inspection policy may be advantageous, as the network orchestration module 110 may dynamically set policies to detect and prevent malicious data requests efficiently and with minimal resources.

At step 450, the network orchestration module 110 sends the selected policy to the first device orchestration module 120 and instructs the first device orchestration module 120 to apply the policy to the data packets destined to the first server 140. The first device orchestration module 120 can apply the policy to the data packets destined to the first server 140, e.g., execute a known packet inspection protocol to detect and prevent malicious data requests from reaching the first server 140. The fast-path communication between the first device orchestration module 120 and the network orchestration module 110 setting policies to inspect packets to detect malicious data requests may allow for efficient mitigation of damage from a DDOS attack.

In some embodiments, to prevent clients from transmitting malicious requests, the network orchestration module 110 may set rules at the POP. Setting rules at the POP allows for packet inspection prior to the malicious internet addresses increasing latency at the device orchestration module or the server level. The local network may include a security module (not illustrated) at the POP. The security module may comprise instructions to inspect packets and prevent malicious data from entering the network. The security module may include a known firewall module, an intrusion prevention system, or another known system configured to secure a network.

In some embodiments, the network orchestration module 110 may enact a policy to inspect data packets corresponding to data access requests of particular data type, e.g., video data. In such cases the network orchestration module 110 can determine if the number of data requests for the first server 140 exceeds the request threshold for a particular data type.

Further, in some embodiments, the number of data access requests for the first server 140 considered by the network orchestration module 110 in determining whether there is a potential DDoS attack can be the number of data access requests received at just the first device orchestration module 120 or an aggregate of requests received at all the device orchestration modules.

Figure 5:
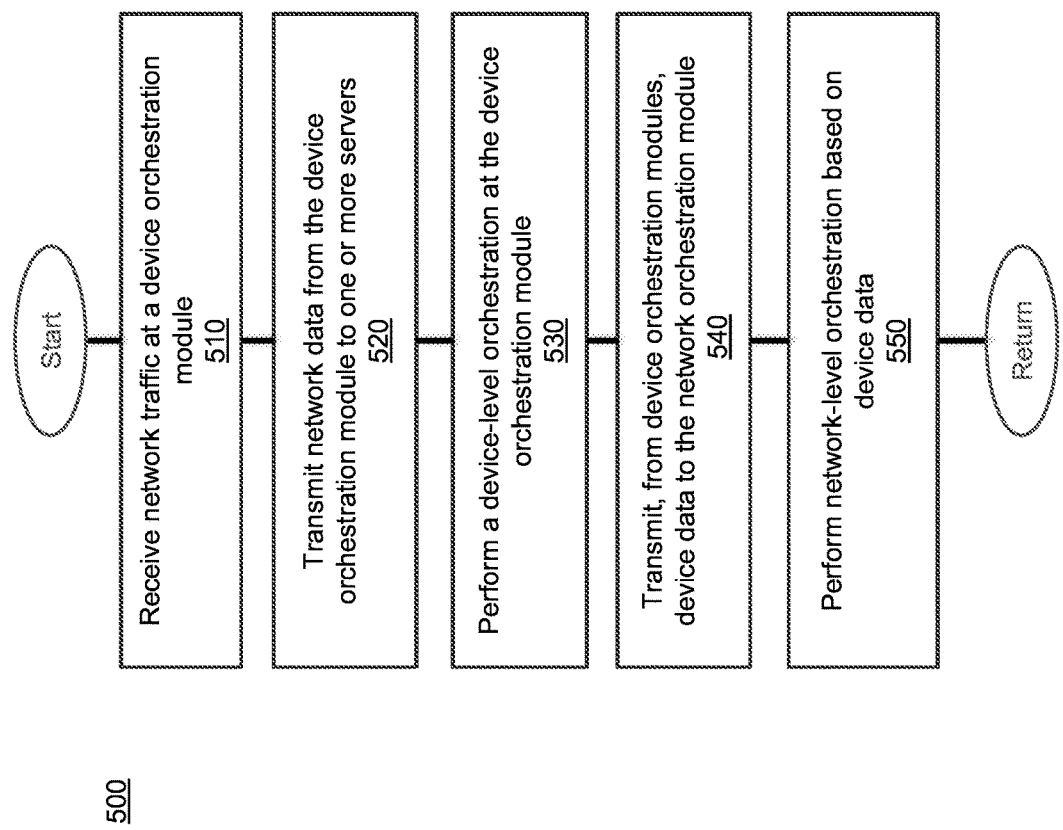
FIG. 5 is a flow diagram of a process to hierarchically orchestrate network traffic, consistent with various embodiments.

FIG. 5 is a flow diagram of a process 500 to hierarchically orchestrate network traffic, consistent with various embodiments. In some embodiments, the process 500 may be implemented in the environment 100 of FIG. 1. At block 510, the first device orchestration module 120 receives network traffic, e.g., as described at least with reference to FIG. 3.

At block 520, the first device orchestration module 120 transmits network traffic to one or more of the servers 140-146, e.g., as described at least with reference to FIG. 3.

At block 530, the first device orchestration module 120 performs a device-level orchestration, e.g., as described at least with reference to FIG. 3.

At block 540, at least some of the device orchestration modules transmit device data to the network orchestration module 110, e.g., as described at least with reference to FIGS. 2 and 4.

At block 550, the network orchestration module 110 performs a network-level orchestration of the network traffic based on the device data from the device orchestration modules, e.g., as described at least with reference to FIGS. 2 and 4.

Figure 6:
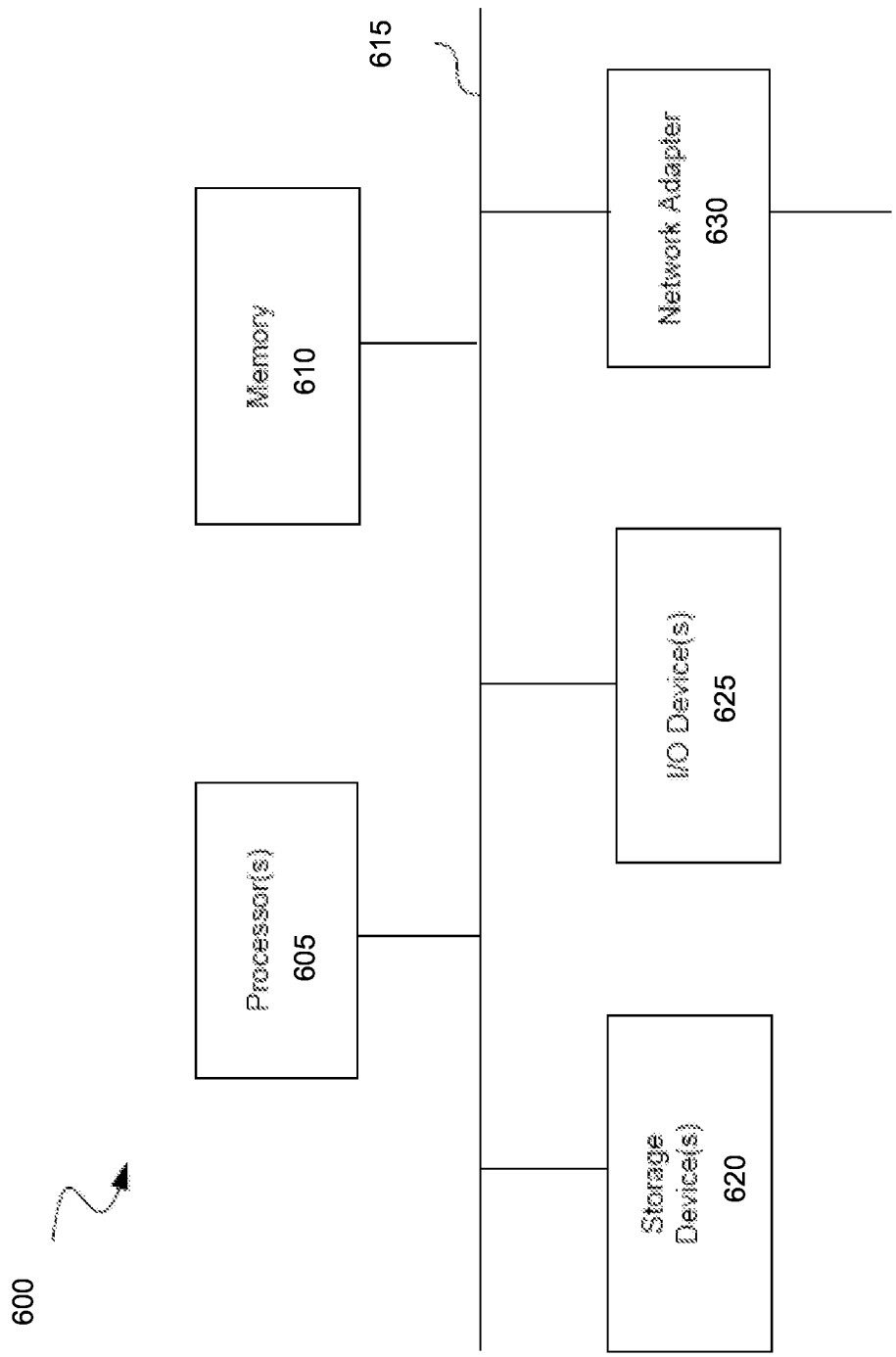
FIG. 6 is a block diagram of a computer system as may be used to implement features of the disclosed embodiments.

FIG. 6 is a block diagram of a computer system as may be used to implement features of the disclosed embodiments. The computer system 600 may be used to implement any of the entities, components, modules, or services depicted in the examples of the foregoing figures (and any other components and/or modules described in this specification). The computer system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615.

The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 610 can be implemented as software and/or firmware to program the processor(s) 605 to carry out actions described above. In some embodiments, such software or firmware may be initially provided to the computer system 600 by downloading it from a remote system through the computer system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A system to orchestrate network traffic, comprising:
   multiple device orchestration modules configured to receive the network traffic, wherein the multiple device orchestration modules include a first device orchestration module configured to receive a first portion of the network traffic, the first device orchestration module including:
   multiple routing nodes including a first routing node and a second routing node, wherein each routing node of the multiple routing nodes is configured to forward a respective portion of the network traffic to one or more server computing devices; and
   a compute node configured to:
   transmit device data to a network orchestration module, wherein the network orchestration module is configured to perform a network level orchestration at least in part by directing the network traffic between the multiple device orchestration modules based at least in part on the device data, and
   perform a device level orchestration at least in part by redirecting a portion of the first portion of the network traffic from the first routing node to the second routing node within the first device orchestration module.

2. The system of claim 1, wherein the one or more server computing devices are configured to process social networking data.

3. The system of claim 1, wherein the compute node is further configured to:
   determine a respective throughput of each of the multiple routing nodes; and
   redirect the first portion of the network traffic between each of the multiple routing nodes to balance the first portion of the network traffic between the multiple routing nodes.

4. The system of claim 1, wherein the network orchestration module is further configured to:
   receive respective device data from each of the multiple device orchestration modules,
   determine an aggregate traffic load of the first device orchestration module based at least in part on the respective device data received from the first device orchestration module,
   determine that the aggregate traffic load exceeds a traffic load threshold of the first device orchestration module, and
   redirect the first portion of the network traffic from the first device orchestration module to a second device orchestration module of the multiple device orchestration modules to balance traffic between the multiple device orchestration modules.

5. The system of claim 4, wherein the network orchestration module is further configured to:
   determine a data type of the first portion of the network traffic to be redirected, and
   redirect the first portion of the network traffic based at least in part on the data type.

6. The system of claim 1, wherein the compute node is further configured to:
   determine that a quantity of access requests received at the first device orchestration module for a specified server computing device of the one or more server computing devices exceeds a specified threshold, and
   notify the network orchestration module of the quantity of access requests for the specified server computing device; and
   wherein the network orchestration module is further configured to:
   set a policy to inspect data packets representing access requests for the specified server computing device, and
   send an instruction to the first device orchestration module to apply the policy to the data packets.

7. The system of claim 1, wherein the network orchestration module is further configured to:

receive notification associated with a respective quantity of access requests received at each of the multiple device orchestration modules for the specified server computing device, determine that an aggregate quantity of access requests received across the multiple device orchestration modules for the specified server computing device exceeds a request threshold, set a policy to inspect data packets representing access requests for the specified server computing device, and send an instruction to the multiple device orchestration modules to apply the policy to the data packets.

8. The system of claim 6, wherein the compute node is further configured to inspect the data packets representing access requests for the specified server computing device.

9. The system of claim 1, wherein the first device orchestration module is configured to utilize flow pinning to maximize cache hit rate of the first device orchestration module.

10. The system of claim 1, wherein the compute node is one of multiple compute nodes in the first device orchestration module, and wherein a number of the multiple compute nodes can be adjusted dynamically based on a traffic load on the first device orchestration module.

11. A method to orchestrate network traffic, comprising:
receiving, at a first device orchestration module of multiple device orchestration modules in a computer network, a first portion of the network traffic for being forwarded to multiple server computing devices;

forwarding, by multiple routing nodes of the first device orchestration module, the first portion of the network traffic to the multiple server computing devices, the multiple routing nodes including a first routing node and a second routing node;

performing a device level orchestration at the first device orchestration module based at least in part on traffic information of the network traffic, at least in part by redirecting a portion of the first portion of the network traffic from the first routing node to the second routing node;

transmitting, by the multiple device orchestration modules, device data to a network orchestration module in the computer network, the device data having information regarding at least one of (a) respective network traffic at a corresponding device orchestration module of the multiple device orchestration modules, or (b) a respective one or more attributes of the corresponding device orchestration module, the device data to be used by the network orchestration module to orchestrate the network traffic between the multiple device orchestration modules in the computer network; and performing, at the network orchestration module, a network level orchestration to redirect the network traffic between the multiple device orchestration modules based at least in part on the device data received.

12. The method of claim 11 further comprising:
determining, at the first device orchestration module and based at least in part on the traffic information, that a traffic load of the first routing node exceeds a traffic threshold; and redirecting, at the first device orchestration module, the portion of the first portion of the network traffic from the first routing node to the second routing node responsive at least in part to determining that the traffic load of the first routing node exceeds the traffic threshold.

13. The method of claim 11, wherein transmitting the device data includes:
transmitting the device data relating to a throughput of the first device orchestration module, determining, at the network orchestration module and based at least in part on the device data, that the throughput of the first device orchestration module exceeds a throughput threshold, and redirecting, by the network orchestration module, the network traffic from the first device orchestration module to another one of the multiple device orchestration modules.

14. The method of claim 11, wherein transmitting the device data includes:
receiving, at the network orchestration module and from the first device orchestration module, the device data a quantity of access requests received at the first device orchestration module for a specified server computing device of the multiple server computing devices, determining, at the network orchestration module, that the quantity of access requests received at the first device orchestration module for the specified server computing device exceeds a request threshold, and setting, at the network orchestration module, a policy to inspect data packets representing access requests for the specified server computing device before transmitting the access requests to the specified server computing device.

15. The method of claim 14 further comprising:
transmitting, by the network orchestration module, the policy to the first device orchestration module; and instructing, by the network orchestration module, the first device orchestration module to apply the policy to the data packets.

16. The method of claim 15 further comprising:
inspecting, at the first device orchestration module, the data packets prior to forwarding the data packets to the specified server computing device.

17. The method of claim 14, wherein determining that the quantity of access requests received at the first device orchestration module exceeds the request threshold includes:
comparing, at the network orchestration module, the quantity of access requests received at the first device orchestration module with a quantity of access requests received at a second device orchestration module of the multiple device orchestration modules for the specified server computing device, and determining, at the network orchestration module, that the quantity of access requests exceeds the request threshold if the difference between the quantity of access requests received at the first device orchestration module and the quantity of access requests received at the second device orchestration module exceeds a difference threshold.

18. A non-transitory computer-readable storage medium storing computer-readable instructions, comprising:
instructions for routing, at a first device orchestration module of multiple device orchestration modules in a computer network, a first portion of network traffic to multiple server computing devices via multiple routing nodes of the first device orchestration module, the multiple routing nodes including a first routing node and a second routing node;

instructions for performing, at the first device orchestration module and based at least in part on traffic information of the network traffic, a device level orchestration at least in part by redirecting a portion of the first portion of the network traffic from the first routing node to the second routing node;

instructions for transmitting, from the multiple device orchestration modules, device data to a network orchestration module in the computer network, the device data having information regarding at least one of (a) respective network traffic at a corresponding device orchestration module, or (b) a respective one or more attributes of the corresponding device orchestration module; and instructions for performing, at the network orchestration module and based at least in part on the device data, a network level orchestration to orchestrate the network traffic between the multiple device orchestration modules in the computer network.

19. The non-transitory computer-readable storage medium of claim 18 further comprising:

instructions for determining, at the network orchestration module and based at least in part on the device data, that a traffic load of the first device orchestration module exceeds a throughput threshold; and instructions for redirecting, at the network orchestration module, at least some of the first portion of the network traffic from the first device orchestration module to another device orchestration module of the multiple device orchestration modules.

20. The non-transitory computer-readable storage medium of claim 18 further comprising:

instructions for reprogramming, at the first device orchestration module, a path via which the first portion of the network traffic is to be forwarded to the multiple server computing devices.

* * * * *